United States Patent
Nakajima et al.

(10) Patent No.: US 10,750,764 B2
(45) Date of Patent: Aug. 25, 2020

(54) STEVIA-CONTAINING BEVERAGE

(71) Applicant: SUNTORY HOLDINGS LIMITED, Osaka (JP)

(72) Inventors: Makoto Nakajima, Kanagawa (JP); Yasuyuki Kobayashi, Kanagawa (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 0 days.

(21) Appl. No.: 16/089,979

(22) PCT Filed: Mar. 31, 2017

(86) PCT No.: PCT/JP2017/013548
§ 371 (c)(1),
(2) Date: Sep. 28, 2018

(87) PCT Pub. No.: WO2017/170990
PCT Pub. Date: Oct. 5, 2017

(65) Prior Publication Data
US 2019/0183148 A1    Jun. 20, 2019

(30) Foreign Application Priority Data

Mar. 31, 2016  (JP) .................. 2016-072269

(51) Int. Cl.
*A23L 2/60* (2006.01)
*A23L 27/30* (2016.01)
*A23L 27/00* (2016.01)
*A23F 3/16* (2006.01)
*A23L 2/00* (2006.01)

(52) U.S. Cl.
CPC .................... *A23L 2/60* (2013.01); *A23F 3/16* (2013.01); *A23L 2/00* (2013.01); *A23L 27/00* (2016.08); *A23L 27/36* (2016.08); *A23L 27/88* (2016.08); *A23V 2002/00* (2013.01); *A23V 2200/16* (2013.01); *A23V 2250/214* (2013.01); *A23V 2250/258* (2013.01)

(58) Field of Classification Search
CPC . A23L 2/60; A23L 27/00; A23L 27/36; A23L 27/88; A23L 2/00; A23F 3/16; A23V 2002/00; A23V 2200/16; A23V 2250/214; A23V 2250/258
See application file for complete search history.

(56) References Cited

U.S. PATENT DOCUMENTS

| | | |
|---|---|---|
| 9,169,285 B2 | 10/2015 | Prakash et al. |
| 10,264,811 B2 * | 4/2019 | Shi ........................ A23L 27/36 |
| 2008/0020020 A1 | 1/2008 | Williamson |
| 2008/0226776 A1 | 9/2008 | Roy et al. |
| 2010/0330244 A1 | 12/2010 | Nonaka et al. |
| 2011/0092684 A1 | 4/2011 | Abelyan et al. |
| 2014/0099403 A1 | 4/2014 | Prakash et al. |
| 2014/0271996 A1 | 9/2014 | Prakash et al. |
| 2014/0272068 A1 | 9/2014 | Prakash et al. |
| 2014/0342043 A1 * | 11/2014 | Bell ........................ A23L 2/385 426/72 |
| 2015/0017284 A1 | 1/2015 | Prakash et al. |
| 2015/0050410 A1 * | 2/2015 | Luo .......................... A23L 2/60 426/548 |
| 2015/0320101 A1 * | 11/2015 | Walton ..................... A23L 2/60 426/548 |
| 2015/0327584 A1 * | 11/2015 | Shi ......................... A23L 27/36 426/548 |
| 2016/0198750 A1 | 7/2016 | Carlson et al. |
| 2017/0006906 A1 * | 1/2017 | Jackson .................. A23L 27/36 |
| 2017/0303574 A1 * | 10/2017 | Luo ......................... A23L 29/35 |
| 2017/0362268 A1 * | 12/2017 | Carlson ................. C07H 15/256 |
| 2018/0002306 A1 * | 1/2018 | Jiang .................... C07D 311/42 |
| 2018/0132501 A1 | 5/2018 | Nakajima et al. |
| 2019/0014805 A1 * | 1/2019 | Markosyan ............ C07H 15/24 |
| 2019/0183148 A1 | 6/2019 | Nakajima et al. |
| 2019/0328008 A1 * | 10/2019 | Higiro ...................... A23L 2/02 |

FOREIGN PATENT DOCUMENTS

| | | |
|---|---|---|
| FR | 3012294 | 5/2015 |
| JP | 2006-042728 | 2/2006 |
| JP | 2010-521178 A | 6/2010 |
| JP | 2012-005483 | 1/2012 |
| JP | 2012-055325 | 3/2012 |
| JP | 2013-507914 A | 3/2013 |
| JP | 2013-169204 | 9/2013 |
| JP | 2015-502404 A | 1/2015 |
| WO | 2008/112966 | 9/2008 |
| WO | 2008/112979 A1 | 9/2008 |
| WO | 2011/046423 A1 | 4/2011 |

(Continued)

OTHER PUBLICATIONS

Extended European Search Report in EP Application No. 17775521.2, dated Nov. 7, 2019.
International Search Report (ISR) and Written Opinion for PCT/JP2017/013545, dated Jun. 20, 2017.
Henning et al., "Catechin Content of 18 Teas and a Green Tea Extract Supplement Correlates with the Antioxidant Capacity," *Nutrition and Cancer* 45(2):226-235, 2003.
Decision to Grant a Patent issued in JP 2017-537344, dated Aug. 10, 2017.
Prakash et al., "Development of Next Generation Stevia Sweetener: Rebaudioside M" *Foods*, vol. 3, No. 1, Feb. 27, 2014.
EESR of EP App. No. 17758419.0 dated Mar. 27, 2019.
International Search Report (ISR) for PCT/JP2017/013548, dated Jun. 27, 2017.
Third-party submission filed on Apr. 5, 2018 against U.S. Appl. No. 15/555,787.

*Primary Examiner* — Anthony J Weier
(74) *Attorney, Agent, or Firm* — Greenblum & Bernstein, P.L.C.

(57) ABSTRACT

Beverages having an improvement in continuity of aftertaste caused by Rebaudioside D (RebD) and Rebaudioside M (RebM) and methods of production thereof. A content (A) of catechin compound(s) in beverages is adjusted to within a certain range, a total content (B) of RebM and/or RebD in beverages is adjusted to within a certain range, and B/A is adjusted to within a certain range.

15 Claims, No Drawings

(56) References Cited

FOREIGN PATENT DOCUMENTS

| | | |
|---|---|---|
| WO | 2011/161027 | 12/2011 |
| WO | 2013/066490 | 5/2013 |
| WO | 2013/096420 A1 | 6/2013 |
| WO | 2014/186250 | 11/2014 |
| WO | 2015/023928 A1 | 2/2015 |
| WO | 2017/170990 A1 | 10/2017 |

* cited by examiner

STEVIA-CONTAINING BEVERAGE

TECHNICAL FIELD

Embodiments of the present invention relate to *stevia*-containing beverages.

BACKGROUND ART

*Stevia* extracts are widely used as sweeteners and it is known that glycosides of terpenoids such as stevioside and Rebaudioside A function as sweet components. Recently, there has been progress in the analysis of sweet components contained in the *stevia* extract and studies on various steviol glycosides contained in the *stevia* extract have been conducted. For example, Patent Literature 1 proposes a technique for producing specific steviol glycosides (RebX).

Physiological effects of polyphenols have recently attracted attention due to the increase in health consciousness and the demand for polyphenol-rich beverages has increased too. For example, catechin compound(s), a type of polyphenols, are known to have a suppression effect on an increase in cholesterol and there are needs for beverages containing catechin compound(s). However, catechin compound(s) have a characteristic bitter taste and astringency and therefore methods for reducing the bitter taste and astringency have been proposed to make such beverages more drinkable. For example, Patent Literature 2 discloses that astringency characteristic of catechin compound(s) can be suppressed by adjusting the glutamic acid concentration in beverages containing catechin compound(s) to a certain range.

CITATION LIST

Patent Literature

Patent Literature 1: National Publication of International Patent Application No. 2015-502404

Patent Literature 2: Japanese Patent Laid-Open No. 2006-042728

SUMMARY

Technical Problem

Use of a *stevia* extract, in particular a steviol glycoside, in a beverage may result in a certain undesirable aftertaste.

Objects of one embodiment of the present invention is to provide beverages having an improvement in continuity of aftertaste caused by particular steviol glycosides, specifically Rebaudioside D (RebD) and Rebaudioside M (RebM) and methods of production thereof.

Solution to Problem

One aspect of the present invention provides a beverage comprising catechin compound(s) and RebD and/or RebM, wherein a content (A) of the catechin compound(s) is 1 to 166 ppm, a total content (B) of the RebD and/or RebM is 20 to 500 ppm, and B/A is 2.9 or more, but embodiments of the present invention are not limited thereto.

Advantageous Effects of Invention

According to the present invention, beverages having an improvement in continuity of aftertaste caused by Rebaudioside D (RebD) and/or Rebaudioside M (RebM) are provided.

DESCRIPTION OF EMBODIMENTS

Beverage

Embodiments of the present invention are beverages comprising catechin compound(s) and RebD and/or RebM, wherein a content (A) of catechin compound(s) is within a certain range, a total content (B) of the RebD and/or RebM is within a certain range and the ratio of B/A is 2.9 or more.

Rebaudiosides (hereinafter, referred as "Rebs") are known as sweet components contained in *stevia* extracts. The *stevia* extracts are extracts obtained by extraction and/or purification from *stevia* dry leaves. *Stevia* is a perennial plant in Asteraceae that is native to Paraguay in South America and its scientific name is *Stevia Rebaudiana Bertoni*. Because *stevia* contains components having about 300 times or more the sweetness of sugar, it is grown for extraction and use of these sweet components as a natural sweetener. Known Rebs include RebA, RebB, RebC, RebD, and RebE. Furthermore, the presence of various glycosides such as RebM described in National Publication of International Patent Application No. 2012-504552 has been recently reported. Embodiments of the present invention involve particularly RebM and RebD as *stevia* extracts. RebD and RebM may be obtained on the market or synthesized by an organic chemical method. Moreover, RebD and RebM may be separated and purified from a *stevia* extract as a starting raw material. For example, RebD can be purified according to the method described in U.S. Pat. No. 8,414,949 and RebM can be purified according to the method described in "Foods 2014, 3 (1), 162-175; doi: 10.3390/foods3010162".

Methods for quantifying RebD and RebM contained in beverages are not particularly limited and known methods may be used, but, for example, they can be analyzed with a high performance liquid chromatograph (HPLC) under the conditions described in National Publication of International Patent Application No. 2012-504552. RebD and RebM are analyzed herein by the method, unless otherwise described.

Beverages of embodiments of the present invention may contain one or both of RebD and RebM and the total content of RebD and/or RebM relative to the weight of the beverage is 20 to 500 ppm (approximately 0.002 to 0.05% by weight), preferably 30 to 400 ppm, more preferably, 40 to 350 ppm, and further more preferably 50 to 320 ppm. In another embodiment, the total content of RebD and/or RebM in beverages according to the present invention may be 60 to 330 ppm or 180 to 330 ppm relative to the weight of the beverage. The "total content of RebD and/or RebM" as used herein means the total content of RebD and RebM when the beverage contains both RebD and RebM, the content of RebD when the beverage contains only RebD, and the content of RebM when the beverage contains only RebM.

In one embodiment, when a beverage according to the present invention contains only one of RebD and RebM, the content of RebD or RebM in the beverage according to the present invention is preferably 20 to 500 ppm (approximately 0.002 to 0.05% by weight), preferably 30 to 400 ppm, more preferably 40 to 350 ppm, and further more preferably 50 to 320 ppm relative to the weight of the beverage. Furthermore, in another embodiment, the content of RebD or RebM in a beverage according to the present invention may be 60 to 330 ppm or 180 to 330 ppm relative to the weight of the beverage.

Catechin compound(s) are a type of polyphenols and known to have a characteristic bitter taste and astringency. In the present invention, an undesirable aftertaste caused by RebD and RebM is suppressed by blending a certain amount of catechin compound(s).

In an embodiment of the invention, the content of catechin compound(s) relative to the weight of the beverage is 1 to 166 ppm (approximately 0.0001 to 0.0166% by weight), preferably 5 to 130 ppm, more preferably 10 to 110 ppm, 20 to 100 ppm, and further more preferably 20 to 90 ppm and may be 30 to 70 ppm. Unless otherwise specified, "ppm", as used herein, means weight/weight (w/w) ppm.

As used herein, the "catechin compound(s)" refers to a generic name of catechin, epicatechin, gallocatechin, epigallocatechin, catechin gallate, epicatechin gallate, gallocatechin gallate, and epigallocatechin gallate. Accordingly, in embodiments of the present invention, catechin compound(s) may comprise one or more selected from the group consisting of catechin, epicatechin, gallocatechin, epigallocatechin, catechin gallate, epicatechin gallate, gallocatechin gallate, and epigallocatechin gallate. Stating for confirmation, the content of catechin compound(s) mentioned above means the sum of the contents of the aforementioned 8 compounds.

Moreover, in embodiments of the present invention, the percentage of the total amount of gallocatechin gallate and epigallocatechin gallate relative to the content of catechin compound(s) is preferably 30% or more, more preferably 35% or more, and further more preferably 40% or more.

In embodiments of the present invention, the origin of the catechin compound(s) is not particularly limited. For example, it may be those derived from a natural product, those obtained on the market, or those synthesized by an organic chemical method, but it is preferably catechin compound(s) derived from a natural product in view of a recent increase in nature orientation. Examples of natural products include, but are not limited to, tea (green tea, white tea, black tea, oolong tea, mate, and the like), chocolate, cocoa, red wine, fruits (grapes, berries, apples), and the like. In embodiments of the present invention, the catechin compound(s) are preferably those derived from an extract of tea (*Camellia sinensis*) and more preferably those derived from a green tea extract or a black tea extract.

In embodiments of the present invention, it is possible to sufficiently exhibit the sweetness of RebD and RebM while suppressing the undesirable aftertaste caused by RebD and RebM by adjusting the content of catechin compound(s) and the total content of RebD and/or RebM within the aforementioned ranges. As used herein, the undesirable aftertaste caused by RebD and RebM means a sweet taste of RebD and RebM that is an undesirable continuity of sweetness.

Furthermore, in embodiments of the present invention, a weight ratio of a total content (B) of RebD and/or RebM relative to a content (A) of catechin compound(s) (B/A) is 2.9 or more, preferably 3.0 or more, more preferably 3.1 or more, further more preferably 4.0 or more, and particularly preferably 5.0 or more. If A and B meet the conditions, then it is possible to sufficiently exhibit a preferable sweetness as a sugar-containing beverage while suppressing an undesirable aftertaste caused by RebD and RebM. Moreover, in embodiments of the present invention, the weight ratio of the total content (B) of RebD and/or RebM relative to the content (A) of catechin compound(s) (B/A) is preferably 20 or less, more preferably 15 or less, and further more preferably 9.0 or less. Typically, the range of the weight ratio of the total content (B) of RebD and/or RebM relative to the content (A) of catechin compound(s) in beverages of embodiments of the present invention (B/A) is preferably 2.9 to 20, 2.9 to 15, 2.9 to 9.0 and more preferably 3.0 to 9.0.

Furthermore, in embodiments of the present invention, a ratio of the content of RebD relative to the content of catechin compound(s) ([content of RebD]/[content of catechin compound(s)]) is 2.9 or more, preferably 3.0 or more, more preferably 3.1 or more, further more preferably 4.0 or more, and particularly preferably 5.0 or more. Moreover, in embodiments of the present invention, the ratio of the content of RebD relative to the content of catechin compound(s) ([content of RebD]/[content of catechin compound(s)]) is preferably 20 or less, more preferably 15 or less, and further more preferably 9.0 or less. Typically, in embodiments of the present invention, the range of the ratio of the content of RebD relative to the content of catechin compound(s) ([content of RebD]/[content of catechin compound(s)]) is preferably 2.9 to 20, 2.9 to 15, 2.9 to 9.0 and more preferably 3.0 to 9.0.

Moreover, in one embodiment of the present invention, a ratio of the content of RebM relative to the content of catechin compound(s) ([content of RebM]/[content of catechin compound(s)]) is 2.9 or more, preferably 3.0 or more, more preferably 3.1 or more, further more preferably 4.0 or more, and particularly preferably 5.0 or more. Moreover, in one embodiment of the present invention, the ratio of the content of RebM relative to the content of catechin compound(s) ([content of RebM]/[content of catechin compound(s)]) is preferably 20 or less, more preferably 15 or less, and further more preferably 9.0 or less. Typically, in one embodiment of the present invention, the range of the ratio of the content of RebM relative to the content of catechin compound(s) ([content of RebM]/[content of catechin compound(s)]) is preferably 2.9 to 20, 2.9 to 15, 2.9 to 9.0 and more preferably 3.0 to 9.0.

Beverages of embodiments of the present invention may contain, as needed, additives usually contained in beverages, for example, antioxidants, emulsifiers, nutrient supplements (vitamins, calcium, minerals, amino acids), flavors, pigments, preservatives, flavoring agents, extracts, pH regulators, quality stabilizer, fruit juice, fruit juice puree, and the like. These additives may be blended singly in the beverages or a plurality of these components may be blended in combination in the beverages.

Embodiments of the present invention are not particularly limited, but examples include refreshing beverages, non-alcoholic beverages, alcoholic beverages, and the like. The beverages may be beverages containing no carbonic acid gas or may be beverages containing carbonic acid gas. Examples of the beverages containing no carbonic acid gas include, but are not limited to, tea beverages such as green tea, oolong tea, black tea, barley tea, mate, and the like, coffee, fruit juice beverages, milk beverages, sports drinks, and the like. Examples of the beverages containing carbonic acid gas include, but are not limited to, cola, diet cola, ginger ale, soda pop, and carbonated water provided with a fruit juice flavor. In particular, from a point of view to maintain the tea-like preferable flavor, embodiments of the present invention are preferably tea beverages such as green tea, oolong tea, black tea, barley tea, mate, and the like.

In beverages of embodiments of the present invention, calories are preferably 20 kcal/100 ml or less and more preferably 10 kcal/100 ml or less or 5 kcal/100 ml or less. Since RebD and RebM contained in *stevia* extracts are low-calorie, they are particularly suitable in producing low-calorie or non-calorie beverages.

Beverages of embodiments of the present invention may be provided in containers, as needed. The form of the containers is not limited at all and the beverages may be filled into containers such as glass bottles, cans, barrels, or PET bottles and provided as beverages in containers. Moreover, the method of filling the beverages into containers is not particularly limited.

Beverages according to one embodiment of the present invention may be produced in an appropriate manner. In one embodiment of the invention, a beverage according to the present invention may be produced by a method comprising the step of blending RebD and/or RebM with catechin compound(s) such that a content (A) of the catechin compound(s) in the beverage is 1 to 166 ppm, a total content (B) of the RebD and/or RebM in the beverage is 20 to 500 ppm, and B/A is 2.9 or more.

The method of blending the catechin compound(s) is not particularly limited and, for example, the catechin compound(s) themselves may be blended or a raw material containing the catechin compound(s) may be blended. Moreover, the method of blending RebD and/or RebM is not particularly limited as well and the RebD and/or RebM itself may be blended or a raw material containing the RebD and/or RebM may be blended. The type and the preferred range of the content of the catechin compound(s), the preferred range of the total content of RebD and/or RebM, and the like are as described above for the beverages.

A beverage according to one embodiment of the present invention may comprise a step of blending an additive or the like usually blended into beverages and/or a step of filling the beverage into a container. Types of the additive and the container are as described above as for beverages and filling of the container may be done by using a known method.

Beverages according to one embodiment of the present invention can exhibit a preferable sweetness as a sugar-containing beverage while suppressing an undesirable continuity of sweetness caused by RebD and RebM. In one embodiment of the invention, the aforementioned method of production may be contemplated as a method for suppressing an undesirable continuity of sweetness caused by RebD and RebM while exhibiting sweetness suitable for a beverage.

EXPERIMENTAL EXAMPLES

Hereinafter, embodiments of the present invention are described referring to specific examples, but embodiments of the present invention are not limited thereto. Herein, unless otherwise stated specifically, % and parts are by weight and the stated numerical ranges include the endpoints.

(Production and Evaluation of Beverage)

Beverages in containers were prepared in the formulations set forth in the following tables and sensuality evaluation for flavors of the beverages was conducted. More specifically, solutions of various catechin concentrations were provided using a catechin formulation (Sunphenon, a product of Taiyo Kagaku Co., Ltd.) derived from a tea extract. RebD was blended therein to prepare sample beverages and the beverages were filled into containers. The catechin formulation used is derived from an extract of tea (*Camellia sinensis*) and the percentage of the total amount of gallocatechin gallate and epigallocatechin gallate relative to the content of catechin compound(s) is approximately 60%.

Subsequently, a sensuality evaluation test for "masking effect on continuity of sweetness" and "preferable sweetness as beverage" by expert panels was conducted by tasting of sample beverages. The sensuality evaluation was conducted in 2 grades by the following standard. For either of the evaluation categories, point 2 indicates a sufficient quality. "Preferable sweetness": this was evaluated in terms of pleasant sweetness that allows 500 ml of beverage to be drunken without being got tired of (2 points: preferable, 1 point: not so preferable).

"Masking effect on continuity of sweetness": this was evaluated in terms of alleviation of continuity of sweetness remained in mouth characteristic of RebD and/or RebM in 500 ml of the beverage (2 points: effective, 1 point: no so effective).

TABLE 1

|  | Sample No. | | | | | | | | | | |
| --- | --- | --- | --- | --- | --- | --- | --- | --- | --- | --- | --- |
|  | 1 | 2 | 3 | 4 | 5 | 6 | 7 | 8 | 9 | 10 | 11 |
| Catechin compound(s) (ppm) | 0.5 | 10 | 20 | 60 | 60 | 60 | 100 | 100 | 150 | 170 | 500 |
| Reb D (ppm) | 100 | 15 | 180 | 180 | 220 | 400 | 300 | 330 | 600 | 500 | 600 |
| Reb D/Catechin compound(s) | 200.0 | 1.5 | 9.0 | 3.0 | 3.7 | 6.7 | 3.0 | 3.3 | 4.0 | 2.9 | 1.2 |
| Masking effect on continuity of sweetness | 1 | 1 | 2 | 2 | 2 | 2 | 2 | 2 | 2 | 2 | 1 |
| Preferable sweetness | 2 | 1 | 2 | 2 | 2 | 2 | 2 | 2 | 1 | 1 | 1 |

The catechin compound(s) content, the RebD content, and the result of sensuality evaluation of each sample beverage are illustrated in Table 1. As apparent from Table 1, it was possible to sufficiently exhibit flavors as a sugar-containing beverage, while masking continuity of sweetness caused by *stevia* by adjusting the catechin compound(s) content and the RebD content within the ranges according to the present invention.

Moreover, an effect similar to that found with RebD was confirmed when sample beverages were prepared in the same way as described above except that RebM was used instead of RebD and the catechin content, the RebM content, and the weight ratio of the RebM content/the catechin content (M/A) were adjusted to within the ranges according to the present invention. The results are illustrated in Table 2.

TABLE 2

|  | Sample No. | | | | | |
| --- | --- | --- | --- | --- | --- | --- |
|  | 12 | 13 | 14 | 15 | 16 | 17 |
| Catechin compound(s) (ppm) | 0.5 | 10 | 20 | 100 | 150 | 170 |
| Reb M (ppm) | 100 | 15 | 180 | 330 | 600 | 500 |

TABLE 2-continued

| | Sample No. | | | | | |
|---|---|---|---|---|---|---|
| | 12 | 13 | 14 | 15 | 16 | 17 |
| Reb M/Catechin compound(s) | 200.0 | 1.5 | 9.0 | 3.3 | 4.0 | 2.9 |
| Masking effect on continuity of sweetness | 1 | 1 | 2 | 2 | 2 | 2 |
| Preferable sweetness | 2 | 1 | 2 | 2 | 1 | 1 |

Furthermore, the difference between the effects of different Rebs was examined as follows. First, sample beverages were prepared in the same way as described above except that RebA was used instead of RebD and RebM. The catechin content and the RebA content of the beverages were measured and the weight ratio of the RebA content/the catechin content (C/A) was calculated (Table 3). A sensuality evaluation test was conducted according to the method described above. The results are illustrated in Table 3. It was revealed that the effect was inferior with RebA.

TABLE 3

| | 18 |
|---|---|
| Catechin compound(s) (ppm) (A) | 100 |
| RebA (ppm) (C) | 330 |
| C/A | 3.3 |
| Masking effect on continuity of sweetness | 1 |
| Preferable sweetness | 2 |

The invention claimed is:

1. A beverage comprising:
catechin compound(s) and RebD, wherein a content (A) of the catechin compound(s) is 20 to 100 ppm, a content (B) of the RebD is 180 to 400 ppm, and B/A is 3.0 to 9.0.

2. The beverage according to claim 1, wherein the catechin compound(s) are derived from a tea extract.

3. The beverage according to claim 2, wherein the tea extract is derived from *Camellia sinensis*.

4. The beverage according to claim 1, wherein the beverage has calories of 20 kcal/100 ml or less.

5. A beverage comprising:
catechin compound(s) and RebM, wherein a content (A) of the catechin compound(s) is 20 to 100 ppm, a total content (B) of the RebM is 180 to 330 ppm, and B/A is 3.3 to 9.0.

6. The beverage according to claim 5, wherein the catechin compound(s) are derived from a tea extract.

7. The beverage according to claim 6, wherein the tea extract is derived from *Camellia sinensis*.

8. The beverage according to any of claim 5, wherein the beverage has calories of 20 kcal/100 ml or less.

9. A beverage comprising:
catechin compound(s), RebD, and RebM, wherein a content (A) of the catechin compound(s) is 1 to 166 ppm, a total content (B) of the RebD and RebM is 20 to 500 ppm, and B/A is 2.9 or more.

10. The beverage according to claim 9, wherein the catechin compound(s) are derived from a tea extract.

11. The beverage according to claim 10, wherein the tea extract is derived from *Camellia sinensis*.

12. The beverage according to any of claim 9, wherein the beverage has calories of 20 kcal/100 ml or less.

13. The beverage according to claim 1, wherein the catechin compound(s) is selected from the group consisting of a catechin, an epicatechin, a gallocatechin, a epigallocatechin, a catechin gallate, an epicatechin gallate, a gallocatechin gallate, an epigallocatechin gallate, and combinations thereof.

14. The beverage according to claim 5, wherein the catechin compound(s) is selected from the group consisting of a catechin, an epicatechin, a gallocatechin, a epigallocatechin, a catechin gallate, an epicatechin gallate, a gallocatechin gallate, an epigallocatechin gallate, and combinations thereof.

15. The beverage according to claim 9, wherein the catechin compound(s) is selected from the group consisting of a catechin, an epicatechin, a gallocatechin, a epigallocatechin, a catechin gallate, an epicatechin gallate, a gallocatechin gallate, an epigallocatechin gallate, and combinations thereof.

* * * * *